United States Patent [19]
Reslinger et al.

[11] Patent Number: 5,648,007
[45] Date of Patent: Jul. 15, 1997

[54] METHOD OF PERFORMING ARC WELDING BETWEEN OPTICAL FIBERS

[75] Inventors: Michel Reslinger, Bondoufle; Daniel Casthelain, Colombes; Roland Hakoun, Domont, all of France

[73] Assignee: Alcatel Cable Interface, Vrigne Aux Bois, France

[21] Appl. No.: 425,801

[22] Filed: Apr. 20, 1995

[30] Foreign Application Priority Data

Apr. 25, 1994 [FR] France ................................. 94 04955

[51] Int. Cl.$^6$ ................................................ B23K 9/095
[52] U.S. Cl. ............... 219/383; 219/121.46; 219/130.32; 65/407
[58] Field of Search ..................... 219/383, 137 R, 219/121.45, 121.46, 130.32; 65/406, 407, 152

[56] References Cited

U.S. PATENT DOCUMENTS

| | | | |
|---|---|---|---|
| 4,049,414 | 9/1977 | Smith | 65/4 B |
| 4,266,852 | 5/1981 | Higgins et al. | 219/121.48 |
| 5,122,638 | 6/1992 | Sato et al. | 219/383 |
| 5,218,184 | 6/1993 | Hakoun et al. | 65/4.2 |

FOREIGN PATENT DOCUMENTS

| | | |
|---|---|---|
| 0494809A1 | 7/1992 | European Pat. Off. . |
| 4139152A1 | 6/1993 | Germany . |

OTHER PUBLICATIONS

*Journal of Lightwave Technology*, vol. 11, No. 4, Apr. 1993, New York, US, pp. 548–553, W. Zheng, "Real time control of arc fusion for optical fiber splicing".

*Patent Abstracts of Japan*, vol. 11, No. 19 (P–537) 20 Jan. 1987 & JP-A-61 194 410 (Fujikura).

*Primary Examiner*—Mark H. Paschall
*Attorney, Agent, or Firm*—Sughrue, Mion, Zinn, Macpeak & Seas

[57] ABSTRACT

The method of arc welding optical fibers includes a fusion and inter-penetration first step during which the ends subjected to the arc are fused and caused to inter-penetrate, and an alignment second step so as to continue the fusion under the control of the offset that is calculated on the basis of an image of the ends, which are not externally illuminated. The first step is an arc current control step performed in successive current increments, under the control of the brightness taken on by the ends after each increment.

14 Claims, 4 Drawing Sheets

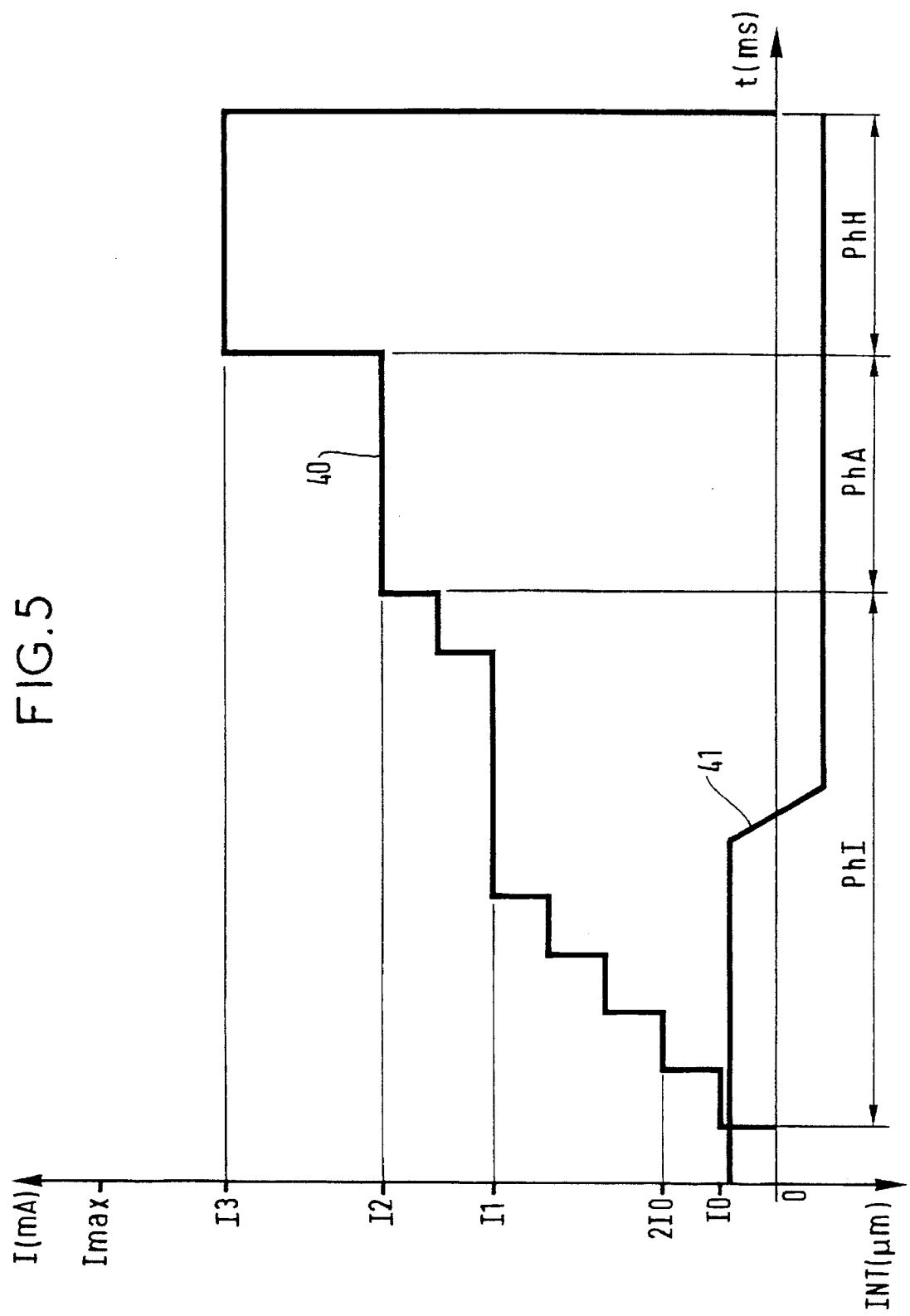

METHOD OF PERFORMING ARC WELDING BETWEEN OPTICAL FIBERS

The present invention relates to splicing together optical fibers by arc welding their facing ends together. The arc used for such welding is usually an electric arc produced between two electrodes situated on either side of the ends to be welded together and subjected to a control potential difference to which the arc current is servo-controlled.

BACKGROUND OF THE INVENTION

Generally speaking, and as is known per se, an optical fiber arc welding operation can be broken down into three main cycles which take place one after another over time, and which are performed with respective arc current and arc duration values that are often predetermined. These cycles take place in succession as follows:

- a cleaning cycle during which the ends to be welded together are cleaned;
- a pre-fusion cycle during which the ends are pre-fused; and
- a fusion proper cycle during which the ends inter-penetrate, melt together, and become united.

An article entitled "Real Time Control of Arc Fusion for Optical Fiber Splicing" by W. Zheng, published in the Journal of Lightwave Technology, vol. 11, No. 4, Apr. 1993 describes in particular a control procedure for controlling the fusion cycle during which the ends of the fibers are fused together. That control procedure is based on the fact that the cores of the fibers are made directly visible during fusion. Under those conditions, and by analyzing and processing the digital image taken, it is then possible to calculate the mutual offset between the cores, and to control the final duration of the cycle accordingly so that the surface tension created in the fibers as they are fused together reduces the offset between the cores to a predetermined threshold value.

In that article, the control sequence over time for the fusion cycle starts with an arc which has an initial duration that is defined and is long enough (about 0.5 seconds) to melt the ends of the fibers with a certain amount of inter-penetration taking place, and which has a current that is also defined and is high enough (about 15 mA) to make the cores visible. An image of the cores is then taken. It is analyzed so as to calculate the offset between the cores, while maintaining the arc but reducing its current (to about 10 mA) so as to avoid the effects of surface tension. If the calculated offset is less than a predetermined threshold value, the fusion step is considered to be ended and is stopped. Otherwise, the fusion step continues, with pulses of defined and relatively short duration and with current taking the initial value (15 mA) once again, so that the surface tension in the fibers acts on the offset between the cores, and an image is taken again at the end of each pulse. This process is repeated so long as the offset calculated by analyzing the most-recently taken image is not less the threshold value. In this way, the process defines a core-alignment step.

Such a control sequence is adapted to fibers to be welded together that are "of the same type", i.e. that are of analogous nature or that have analogous thermal characteristics, so that they respond almost identically to the electric arc current. This means that, whenever the type of the fibers to be welded together changes to another type, the initial duration and the current of the fusion arc must be changed, or else separate "adapted" control sequences must be provided, each of which is adapted to one of the different types of the fibers to be welded together.

OBJECTS AND SUMMARY OF THE INVENTION

An object of the present invention is to make it possible to perform arc welding between optical fibers, and in particular to control the fusion cycle, by means of a single control procedure for all types of fiber to be welded together, it being possible for the fibers to be welded together to be of the same type (which may be arbitrary), or to be of different types.

The present invention provides a method of performing arc welding between optical fibers, for a fusion cycle in which the facing ends of the fibers are fused together, the method consisting of the following steps:

- during a first step of the cycle, said ends are subjected to a fusion arc and they are caused to inter-penetrate while they are being fused; and
- during an "alignment" second step of said cycle, at least one image is taken of said ends, which are not externally illuminated, image analysis and processing is used to calculate an alignment offset between the ends in each image, and the arc fusion is continued so long as the calculated offset remains greater than a predetermined offset threshold;
- wherein, during said first step, which is referred to as the "fusion arc current control step", the method further consists in varying the current of said arc by successive increments, in also taking at least one image of the non-externally illuminated ends after each increment, in using image analysis and processing to calculate the brightness of each end, and in stopping the incrementation and the current control step as soon as the calculated brightness of one of the ends reaches a first predetermined threshold value.

The method advantageously further exhibits at least one of the following additional characteristics:

- it further consists in taking an initial image of the ends prior to said cycle, which ends are externally illuminated, so as to define at least one analysis window on each end, a brightness value to be detected during said cycle being allocated to each analysis window;
- it consists in defining two analysis windows on the basis of the initial image, and in performing the current control step in two sequences controlled by the brightness calculated over one of the windows in each end, and then by the brightness calculated over the other one of the windows in each end;
- it consists in performing the alignment step under the control of a lateral misalignment calculated on each image of the ends;
- it consists in performing the alignment step at the current obtained at the end of the arc control step; and
- it further consists in performing a "homogenization" final step during which the ends are homogenized, which step is performed after the alignment step, at an arc current value that is a function of the value obtained at the end of the arc control step, but that is limited to a maximum value.

BRIEF DESCRIPTION OF THE DRAWINGS

A preferred implementation of the invention is described in detail below by way of example and with reference to the accompanying drawings, in which:

FIG. 5 shows the fusion cycle for two fibers.

MORE DETAILED DESCRIPTION

Figure 1:
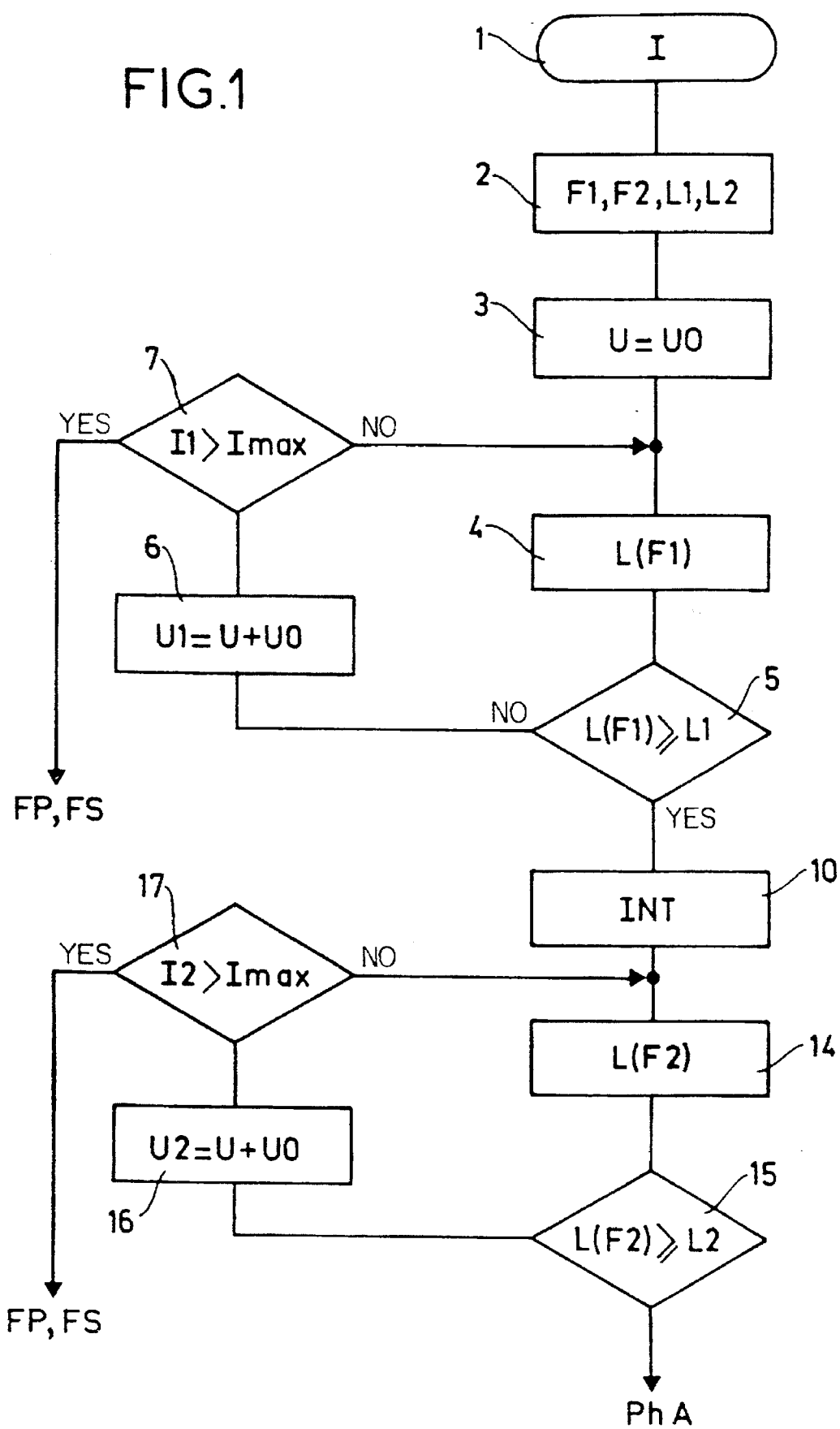
FIGS. 1 and 2 are flow charts representing the control procedure of the invention for a fusion cycle during which the respective ends of two fibers to be welded together are fused.

FIG. 1 represents the procedure followed during a first step of the fusion cycle during which the facing ends of two fibers to be welded together are fused. Said first step is a fusion arc current control step for controlling the fusion arc current received by the ends and produced by two electrodes situated on either side of the ends.

The fusion cycle or the first step of the cycle starts with an initialization operation 1, referenced I. This triggers a loading operation 2 during which two parameters are loaded, which parameters are referred to as "first and second internal analysis windows" for each of the ends, and are referenced $F_1$ and $F_2$ independently of the end in question for reasons of convenience, first and second predetermined and stored brightness values $L_1$ & $L_2$ being respectively associated with the windows.

The analysis windows are obtained on the basis of a plane image of the two ends, which image is taken before the fusion cycle by using an illumination source and an image taking and image analysis video system, and is stored in a memory. Obtaining the windows is described in more detail below with reference to FIG. 3, which is provided for that purpose.

Operation 2 in turn triggers an operation 3 referenced $U=U_0$, during which the electrodes are brought to a voltage U of initial value $U_0$, so as to produce a fusion arc current $I=I_0$, of value that is much too low for the required fusion, and so as to control the current I over time starting from the initial current $I_0$.

The current I is controlled by successive increments of the voltage U between the electrodes, the increments having in particular the same value $U_0$ as the initial voltage, or in a variant, being optionally different therefrom. Current control is governed by the brightness taken on by each end as the fusion progresses. The brightness is zero or almost zero for current $I_0$, and it then appears and increases differently from one end to the other, with the progression of the fusion, and depending on the energy picked up by each of the ends. The brightness is evaluated by analyzing and processing the image of the ends, which image is taken by the video system but without the external illumination source illuminating the ends.

The current is controlled firstly in a first sequence by a first group of operations which are executed one after another in a loop having a conditional exit, and which consist of:

an image taking and image analysis operation 4 for taking and analyzing an image of the two ends, which operation is triggered for the first time by switching the electrodes on at the initial voltage $U_0$, and then after each increment $U_0$ of the voltage U becoming successively $U_1$, the operation including a time-delay for the ends to respond to the new value $I_1$ of the current of the fusion arc, during which operation the image taken is analyzed and processed so as to evaluate the brightness L over the analysis window $F_1$ of each of the ends, as referenced $L(F_1)$;

a comparison operation 5 for comparing the evaluated brightness $L(F_1)$ of each of the ends with the first predetermined value $L_1$, after which operation, if the evaluated brightness of the ends remains less than said first value, the voltage between the electrodes is increased;

a voltage incrementation operation 6 for incrementing the voltage to be applied to the electrodes, as referenced $U_1=U+U_0$; and a "checking" operation 7 consisting in comparing a defined maximum current $I_{max}$ with the current $I_1$ of the fusion arc for the new voltage $U_1$ to be applied, so as to go to the end of the program FP of the fusion cycle and so as to indicate that welding has failed FS, if the current $I_1$ reaches $I_{max}$, and, otherwise, so as to confirm the new voltage $U_1$ to be applied, and so as to take and analyze another image as in operation 4.

As soon as the brightness evaluated over window $F_1$ of one of the two ends reaches said first value $L_1$, the first sequence is ended, and the comparison operation 5 makes exit from the loop possible and triggers an inter-penetration operation 10 for causing the two ends to inter-penetrate, which operation is referenced INT, and is performed by advancing one of the ends a few microns into the other end.

This operation 8 in turn triggers a second current control sequence performed by a second group of successive operations which define another loop that is analogous to the loop of the first group, and which consist of:

an operation 14 analogous to operation 4 and during which image analysis and processing is used to evaluate the brightness L over the analysis window $F_2$ of each of the ends, as referenced $L(F_2)$;

a comparison operation 15 for comparing the evaluated brightness $L(F_2)$ of each of the ends with the second predetermined value $L_2$, after which operation, if the evaluated brightness remains less than $L_2$, the voltage U between the electrodes is increased to become $U_2$ for an arc current $I_2$;

an incrementation operation 16, analogous to operation 6, and during which the voltage to be applied takes a value $U_2=U+U_0$; and a "checking" operation 17 that is analogous to operation 7 and that is looped back on operation 14, so as to repeat operation 14 and the following operations so long as the current $I_2$ corresponding to the new voltage $U_2$ to be applied remains less than $I_{max}$, and, otherwise, so as to go to the end of the program and so as to indicate that welding has failed.

Exit from the loop and the end of the arc current control step are defined at the end of operation 15, as soon as the brightness $L(F_2)$ evaluated over window $F_2$ of one of the ends reaches said second predetermined value $L_2$.

Figure 2:
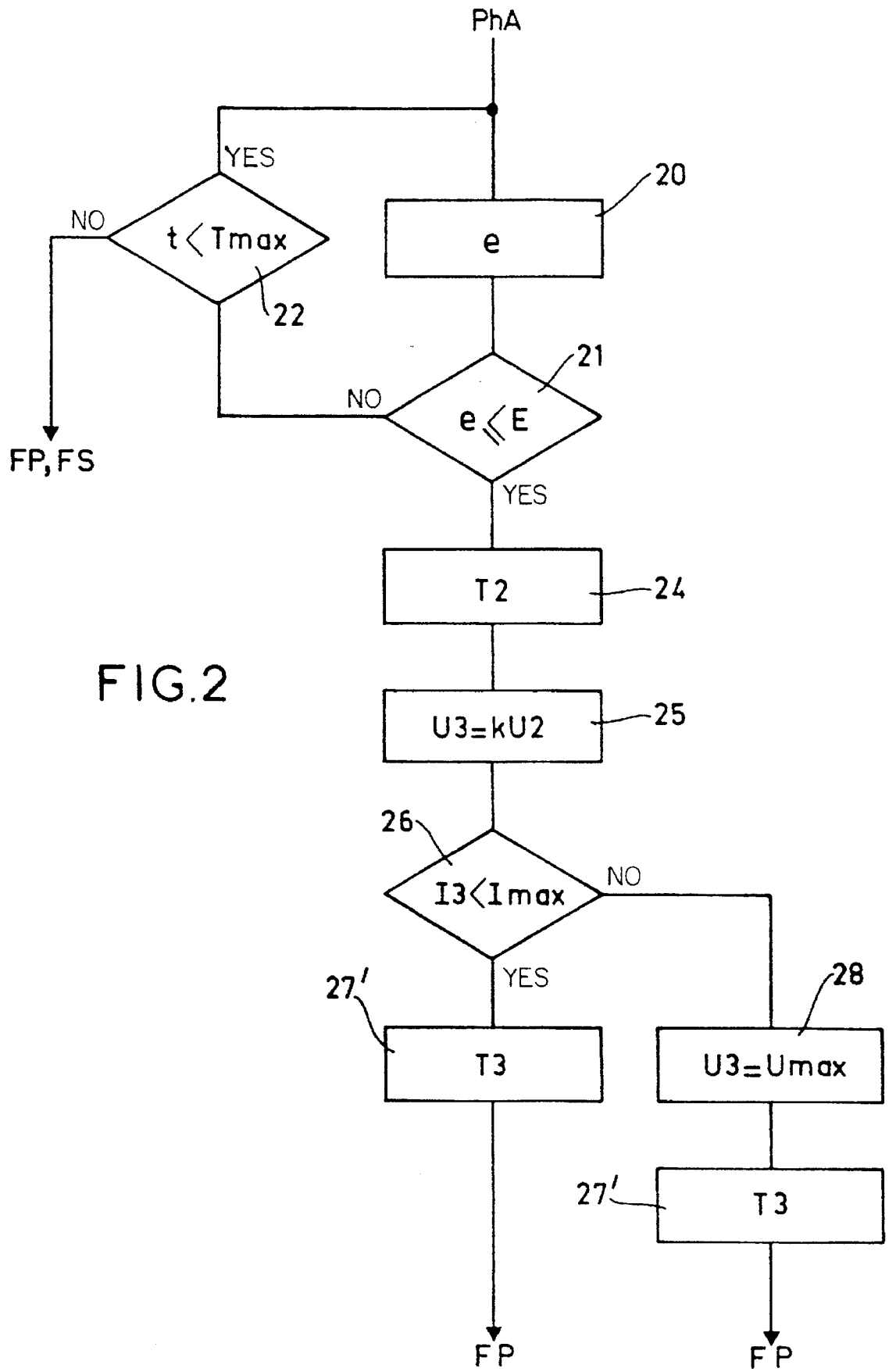

Under these conditions, operation 15 then triggers an "alignment" second step, as referenced PhA in FIGS. 1 and 2.

This step PhA of the welding cycle and a "homogenization" final step thereof during which the ends are homogenized are described with reference to FIG. 2.

The alignment step PhA is executed at constant fusion arc current, whose value is that $I_2$ resulting from the last incrementation of the voltage performed by operation 16 of the arc control step of FIG. 1. The alignment step is governed by a lateral misalignment e between the two ends, which misalignment is calculated by analyzing and processing the image of the two ends as described with reference to FIG. 4. The alignment step continues so long as the calculated misalignment e remains greater than a misalignment threshold E that is predetermined and stored in a memory, without exceeding a maximum duration $T_{max}$, that is defined and that is also stored in a memory.

Continuing to maintain the fusion arc current at this constant value $I_2$ accentuates the surface tension that is created in the ends, and normally tends to reduce their misalignment.

Step PhA consists of a succession of operations in a loop, with exit from the loop being conditional. These operations are as follows:

- an image taking and image analysis operation 20 for taking and analyzing an image of the ends, and for using image processing to calculate the lateral misalignment e of the ends, it being possible for this operation to include a prior time delay and to take into account the difference between the diameters of the ends as calculated before the cycle, so as to reduce the calculated misalignment by a quantity equal to half of the value of said difference;
- a comparison operation 21 for comparing the calculated misalignment e with the predetermined threshold E, after which operation, and if the calculated misalignment is greater than E, the alignment step is continued; and
- a duration-limiting operation 22 for comparing the time t that has elapsed since the beginning of the step with the maximum duration $T_{max}$ allocated to it, after which operation, if the time elapsed is less than the maximum duration, the alignment step is continued by repeating operation 21.

If the elapsed time t reaches $T_{max}$, the program is ended FP, and a welding failure or fault FS is indicated.

Exit from the loop is defined after operation 21 as soon as the calculated misalignment e is less than E. Exit from the loop triggers a time-delay operation 24 of predetermined and stored duration $T_2$, which operation belongs either to the alignment step because it acts for that purpose, or else to final step PhH of the cycle.

The final step is of predetermined duration $T_3$ and is executed at a fusion arc current $I_3$ which is greater than $I_2$ by a factor of k, and which is obtained by increasing the voltage $U_2$ by the factor k. This factor is predetermined and stored in a memory. It results from multiple experimentation trials, and corresponds to an increase of in the range 30% to 40% of the voltage $U_2$.

The final step consists of:

- a definition operation 25 for defining the new voltage $U_3$ to be applied, as referenced $U_3=kU_2$;
- a confirmation operation 26 which consists in comparing the current $I_3$ corresponding to the voltage $U_3$ with the maximum current $I_{max}$, after which operation, if the value $I_3$ is less than $I_{max}$, the voltage $U_3$ is applied to the electrodes; and
- a time-delay operation 27 for duration $T_3$.

If $I_3$ reaches the value $I_{max}$, voltage $U_3$ takes the value $U_{max}$ corresponding to $I_{max}$ in operation 28 and is applied to the electrodes for the duration $T_3$ of the time-delay operation 27'.

The final step and the fusion cycle are ended after the time-delay operation $T_3$ and the program is ended FP so that the voltage U between the electrodes returns to zero.

Naturally, operations 25, 26, and 28 may be executed during the time-delay $T_2$ of operation 24. Also naturally, instead of reducing the calculated misalignment e by the indicated quantity, the predetermined threshold E may be increased by that quantity.

Figure 3:
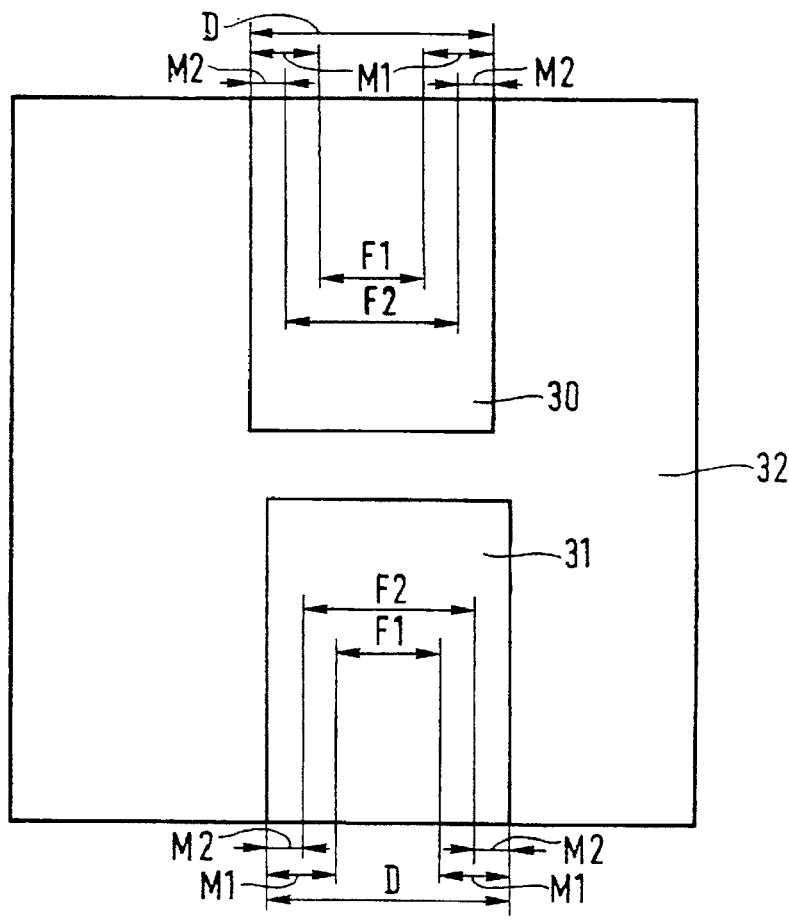
FIGS. 3 and 4 diagrammatically show images of the ends, one image being taken before the cycle, and the other being taken during the cycle.

FIG. 3 shows the "initial" image of the facing but not quite touching ends of the two fibers 30 and 31 to be welded together, which image is taken before the fusion cycle by the video system while the ends are illuminated by an external source. The video system has a CCD camera. It gives a high-definition raster plane image constituted by rows and columns over a total image surface referred to as the "screen" 32. By digitally processing and analyzing this image, it is possible to determine the positions of the ends in the screen, and the real diameter D of each of the ends, and to calculate the analysis windows $F_1$ and $F_2$ in the screen, and more precisely in each end.

The analysis windows $F_1$ and $F_2$ are defined in the real diameter D by respectively taking first and second inside margins $M_1$ and $M_2$ relative to their lateral edges or diameter D in that plane.

The margins are predetermined and stored in a memory. They result from experimentation trials, for the respective brightness values $L_1$ and $L_2$ that are allocated to them, and that are to be detected during the fusion cycle.

Each of the windows $F_1$ and $F_2$ therefore corresponds to a segment length in the screen, or more precisely in each of the ends on the screen.

The same image also makes it possible to calculate the gap d between the end faces of the ends just before the fusion cycle, the value of the gap d being the mean calculated value or optionally the maximum calculated value.

The gap d defines, to within a constant, the advance that must be applied to one of the ends so that they can be caused to inter-penetrate when this operation is triggered during the fusion cycle.

Figure 4:
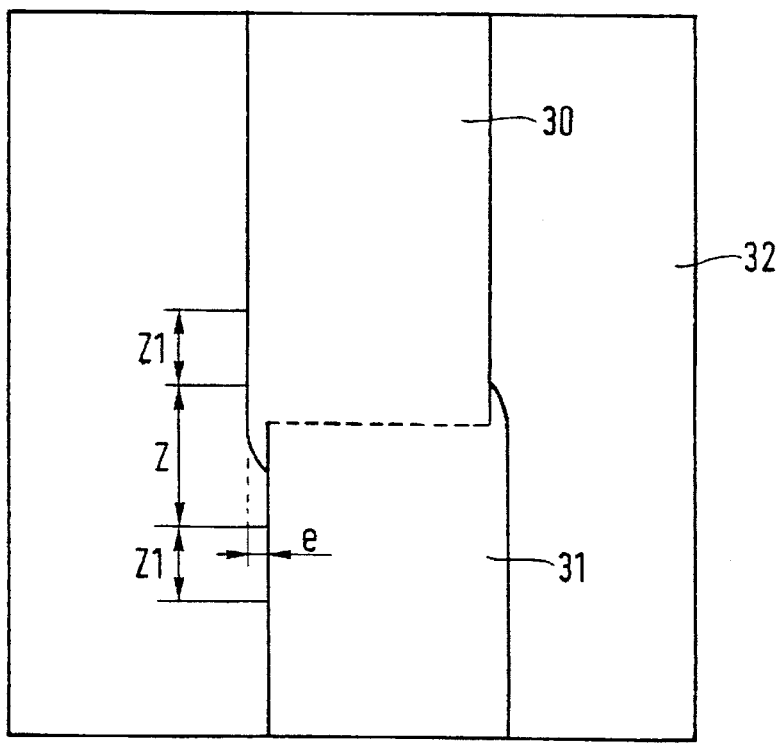

FIG. 4 is a diagram showing the image of the ends after inter-penetration has been caused, which image is taken with no external illumination at the beginning of and during the alignment step so as to calculate the lateral misalignment e that exists.

This misalignment e is calculated on one side only of the ends on this plane image, taking into consideration two lateral calculation zones $Z_1$ and $Z_2$ which are of the same length and which are situated on either side of a zone including the inter-penetration zone. By appropriately choosing the two zones $Z_1$ and $Z_2$, it is possible to eliminate edge effects and effects caused by any possible imperfections in the then coinciding end faces, which imperfections might appear in the inter-penetration zone and in the immediate vicinity thereof, and would then give rise to a calculated misalignment that is not real.

FIG. 5 shows the fusion cycle during which the ends of two given fibers are fused. It shows a curve 40 giving the variation in the current I of the fusion arc in milliamps (mA), and a curve 41 giving the inter-penetration INT of the ends in microns, over time t in milliseconds (ms), and for the two fibers.

With reference to these curves, it should be noted that:

- the arc current control first step referenced PhI is performed in two stages or sequences by current increments $I_0$ up to the current $I_1$ and then to the current $I_2$, these values $I_1$ and $I_2$ not being predetermined but rather corresponding to the brightness values $L_1$ and $L_2$ being acquired over the windows $F_1$ and $F_2$ of any one of the two ends, the duration of each of the two stages being variable for two other fibers, and the two stages being separated by the inter-penetration operation that is executed at current $I_1$ and in a given duration for all fibers;
- the duration of the alignment step PhA is variable for two other fibers and the alignment step is performed at the preceding current $I_2$ maintained constant, and within a fixed maximum duration limit; and
- the final step PhH is performed at a constant current defined as a function of current $I_2$, while being limited to the value $I_{max}$, and in a given duration for all fibers.

The final step prolongs fusion and improves alignment. It compensates for the alignment correction performed in the preceding step on the basis of the misalignment calculated in the plane of the image of the ends only.

Such a fusion cycle makes it possible to overcome differences in the surrounding conditions and in the type of fiber to be welded together. The first step of such a fusion cycle is automatically servo-controlled to compensate for differences in melting points between the fibers to be welded together. It makes it possible for the cycle to be adapted to almost all types of fiber.

We claim:

1. A method of performing arc welding between optical fibers, for a fusion cycle in which the facing ends of the fibers are fused together, the method comprising the following steps:

a first step of subjecting said ends to a fusion arc and causing said ends to interpenetrate while they are being fused, said first step comprising the steps of:

varying the current of said arc by successive increments;

taking at least one image of the non-externally illuminated ends after each increment;

calculating the brightness of each end based on the image; and stopping the incrementation and the current control step as soon as the calculated brightness of one of the ends reaches a first predetermined threshold value; and a second step of taking at least one image of said ends, which are not externally illuminated, calculating an alignment offset between the ends in each image based on the image, and causing the arc fusion to continue as long as the calculated offset remains greater than a predetermined offset threshold.

2. A method according to claim 1, further comprising the steps of:

taking an initial image of the ends prior to the fusion cycle, which ends are externally illuminated;

calculating, from the initial image, a first internal analysis window in each end; and stopping said current control step as soon as the brightness calculated over the whole of said first window reaches said first value.

3. A method according to claim 2, further comprising the steps of:

calculating, from the initial image, a second internal analysis window in each end;

performing said current control step in a first current incrementation sequence and then in a second current incrementation sequence;

stopping the first sequence as soon as the brightness calculated over the whole of said second window L(F1) of one of the ends reaches a second predetermined value which is less than the first value.

4. A method according to claim 3, further comprising the step of causing said ends to inter-penetrate when said first sequence is stopped, with the current of the arc being maintained at its value at the end of said first sequence.

5. A method according to claim 4, further comprising the step of causing said ends to inter-penetrate in a defined limited duration before said second sequence of the current control step.

6. A method according to claim 1, further comprising the steps of:

limiting the fusion arc current to a defined maximum current value; and interrupting said control step if the arc current reaches said maximum value.

7. A method according to claim 2, comprising the step of calculating said alignment offset on one of the lateral edges of the ends during said alignment step.

8. A method according to claim 7, wherein the lateral alignment offset is reduced by a quantity equal to half the difference between the diameters of the ends which are calculated and are stored.

9. A method according to claim 7, wherein said alignment step is performed at the arc current value that is obtained on stopping said arc control step, and that is maintained constant.

10. A method according to claim 7, wherein said alignment correction step is performed for a limited maximum duration.

11. A method according to claim 7, wherein the lateral alignment offset is calculated over two lateral zones $Z_1$ and $Z_2$ that are defined and situated on either side of an "inter-penetration" zone.

12. A method according to claim 1, further comprising the steps of:

performing a homogenization third step that is triggered after the alignment step, and that is performed for a pre-established duration, at a third arc current value defined directly as a function of the current value obtained at the end of said current control step.

13. A method according to claim 12, wherein the third current value is in the range 30% to 40% higher than the current value at the end of the current control step.

14. A method according to claim 13, wherein said third current value is limited to a maximum value.

* * * * *